Patented Apr. 18, 1933

1,904,482

UNITED STATES PATENT OFFICE

NILS ERIK LENANDER, OF LOKKEN VERK, NORWAY, ASSIGNOR, BY MESNE ASSIGNMENTS, TO TEXAS GULF SULPHUR COMPANY, OF HOUSTON, TEXAS, A CORPORATION OF TEXAS

PRODUCTION OF ELEMENTAL SULPHUR

No Drawing. Application filed July 26, 1930, Serial No. 471,099, and in Sweden June 18, 1930.

This invention relates to the production of elemental sulphur from a gas containing carbon disulphide, and has for its object the provision of an improved method of liberating in elemental form the sulphur content of such carbon sulphur compound.

While it is known that carbon disulphide reacts with sulphur dioxide with the liberation of elemental sulphur, and certain proposals have heretofore been made to utilize this reaction, no successful practical application of the reaction has been made due, I believe, to the fact that these sulphur compounds only partially react with one another under ordinary conditions.

I have found that carbon sulphur compounds, like carbon disulphide, can be caused to completely react with sulphur dioxide to liberate in elemental form substantially all of the sulphur, at easily attainable temperatures and where the reacting sulphur compounds are present in relatively small percentages in a gas mixture, that is, diluted by a very considerably greater volume of non-reacting gas. Thus I have found that by contacting the reacting carbon disulphide and sulphur dioxide gases with an appropriate catalyst at such temperatures as 300–500° C., substantially complete reaction of the gases takes place. The present invention is based on this discovery and involves subjecting appropriate reacting proportions of carbon disulphide and sulphur dioxide gases to the action of a catalyst adapted to promote the reaction between the sulphur compounds to liberate elemental sulphur.

Various catalysts are available for the practice of the invention, and satisfactory results are secured with a metallic oxide or a mixture of metallic oxides. Bauxite gives good results, provided it is not completely dehydrated, that is where it contains some proportion of combined water. The catalytic material is preferably formed into balls or other suitable shapes, and may advantageously be supported on a perforated grate adapted to be periodically shaken to remove material from the bottom as fresh material is added from time to time at the top.

It is now my preferred practice to make the catalytic mass or material of hydrate of aluminum (or oxide of aluminum containing some proportion of combined water). The aluminum hydrate is mixed with an appropriate amout of cement to which is added a small amount of aluminum powder. The materials are thoroughly mixed dry and then calcium hydrate and water are added in such amount as to produce a sludge or wet cement mass. The mass is placed in boxes where it begins to rise or swell after 40 to 50 minutes forming a porous and blistery product. After some time, depending on the binding capacity of the cement, the mass becomes hard and may be directly used, or may be crushed to pieces of appropriate size.

Where the carbon disulphide is present in the gaseous product of a metallurgical operation, it will generally be found desirable to subject the gas to a conditioning treatment in which finely divided solid matter is removed therefrom. Should the gas contain any relatively coarse solid matter, it should preliminarily be passed through a dust chamber or mechanical dust collector. The relatively fine particles of solid matter in the gas are then removed by electrostatic precipitation. I have found that this treatment of the gas is particularly advantageous as a conditioning step for the contemplated catalytic reaction, especially if the gas contains compounds of zinc, lead and other metals. Relatively fine particles of carbon, ore, and more particularly metal sulphides, such as lead and zinc, coat or film the catalytic material, and, unless removed, impair and ultimately destroy its activity in a few days.

The catalytic reaction is slightly exothermic, and the temperature of the gas rises during its passage through the catalytic material. The operation is preferably controlled so that the temperature of the gas exiting from the catalytic apparatus does not greatly exceed 450° C. In my preferred practice of the invention, the temperature of these exiting gases is maintained around 400° C. The gas entering the catalytic apparatus should preferably have a temperature of at least 350° C., and if lower than about 300° C. the sulphur compounds will not react with the desired velocity. Ordinarily the preceding operations may be controlled to deliver the gas to the catalytic apparatus at the oppropriate temperature. Where this is not possible, the gas may be cooled or heated, as may be necessary.

The present invention is of particular advantage in the treatment of the gaseous product resulting from the smelting of pyrite or other sulphide ore in accordance with the principles disclosed in my copending application for Letters Patent, Serial No. 471,097 filed July 26, 1930. In this smelting operation an ascending current of sulphur dioxide contacts with highly heated carbonaceous material, whereby a part of the sulphur dioxide is reduced to elemental sulphur with the attendant formation of carbon dioxide. The resulting elemental sulphur reacts with the hot carbonaceous material to form carbon sulphur compounds, like carbon disulphide. In the preferred practice of that smelting process there is present in the gaseous product more than sufficient sulphur dioxide to react with all of the sulphur compounds present in the gas to form elemental sulphur.

In those cases where sulphur dioxide is not present in sufficient amount to react with all of the sulphur compounds in the gas, an appropriate amount of sulphur dioxide may be added to the gas, preferably so as to provide a slight excess over and above that required to combine with all of the other sulphur compounds. Instead of adding sulphur dioxide to the gas, a regulated amount of air may be introduced so as to burn a part of the organic sulphur compounds and thereby form the requisite amount of sulphur dioxide.

I claim:—

1. The method of producing elemental sulphur by the reaction of sulphur dioxide and carbon disulphide gases which comprises, subjecting said gases at an elevated temperature to the action of a catalyst of the group consisting of bauxite, aluminum hydrate, and oxide of aluminum containing some proportion of combined water to promote the reaction between said gases with the liberation of elemental sulphur.

2. The method of producing elemental sulphur by the reaction of sulphur dioxide and carbon disulphide gases which comprises, subjecting said gases at a temperature above 300° C. to the action of a catalyst of the group consisting of bauxite, aluminum hydrate and oxide of aluminum containing some proportion of combined water to promote the reaction between said gases with the liberation of elemental sulphur.

3. The method of producing elemental sulphur by the reaction of sulphur dioxide and carbon disulphide contained in the gaseous product of a metallurgical operation which comprises, subjecting said gaseous product to electrostatic precipitation for removing finely divided solid matter therefrom, and subjecting the resulting gaseous product at an elevated temperature to the action of a catalyst of the group consisting of bauxite, aluminum hydrate and oxide of aluminum containing some proportion of combined water to promote the reaction between said sulphur dioxide and carbon disulphide with the liberation of elemental sulphur.

In testimony whereof I have signed my name to this specification.

NILS ERIK LENANDER.